May 21, 1963 C. L. FARRAND 3,090,934
REDUCTION OF UNWANTED COUPLING BETWEEN TRANSFORMER
MEMBERS OF POSITION-MEASURING TRANSFORMERS
Filed Dec. 26, 1957
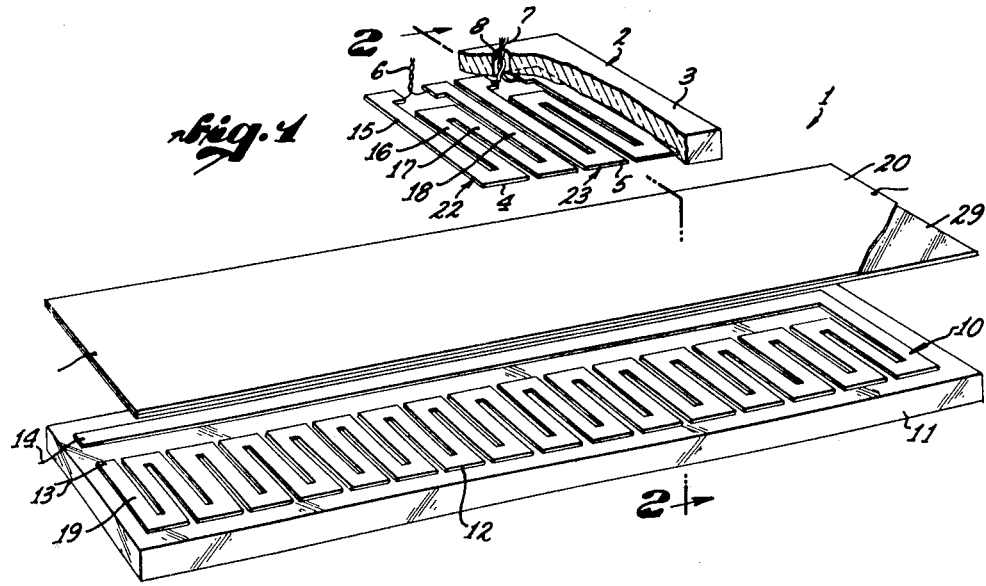
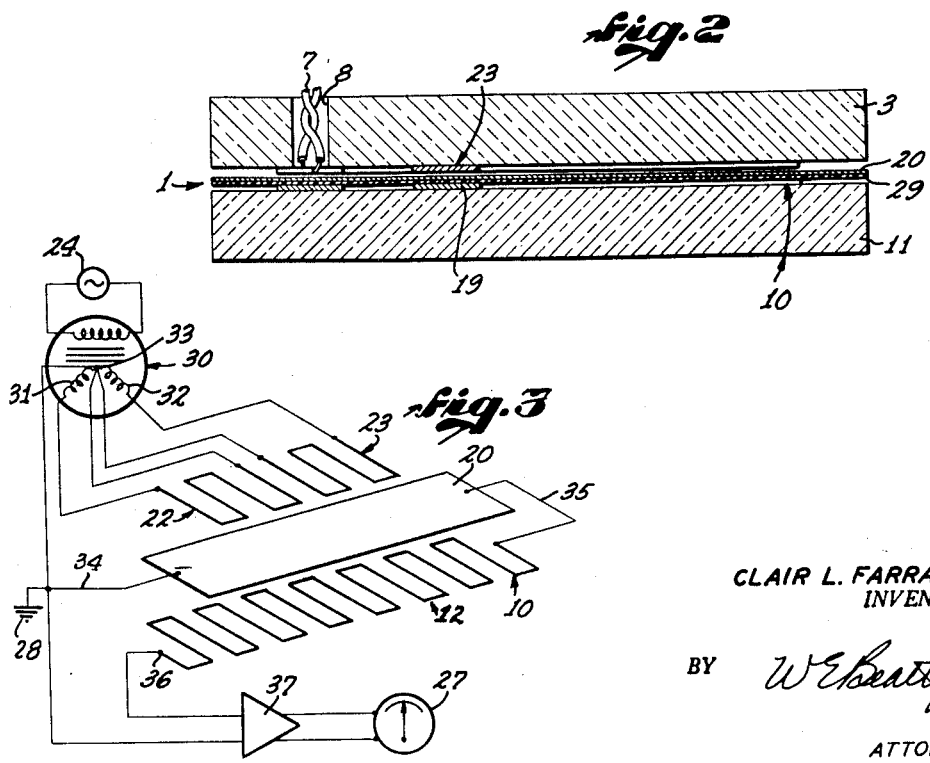
CLAIR L. FARRAND,
INVENTOR.
BY *W E Beatty*
ATTORNEY.

United States Patent Office 3,090,934
Patented May 21, 1963

3,090,934
REDUCTION OF UNWANTED COUPLING BETWEEN TRANSFORMER MEMBERS OF POSITION-MEASURING TRANSFORMERS
Clair L. Farrand, Bronxville, N.Y., assignor to Inductosyn Corporation, Carson City, Nev., a corporation of Nevada
Filed Dec. 26, 1957, Ser. No. 705,156
5 Claims. (Cl. 336—129)

This invention relates to position-measuring transformers having fixed and movable windings of the type described in Tripp-Winget U.S. Patent 2,799,835, patented July 16, 1957.

An object of the present invention is to reduce or eliminate the capacity coupling between the fixed and movable windings without affecting the magnetic coupling between these windings.

Position-measuring transformers are used in both rotary form and linear form to establish positions of rotary shafts and linear slides to an accuracy of a few hundred thousandths of an inch. For example, as applied to positioning the carriage of a machine tool, the two quadrature windings of one transformer member are energized with A.C. voltages whose amplitudes are related as the sine and cosine of the space phase, in the pole cycle of the continuous winding other member, to which the carriage is to be moved. When the carriage is moved to the position corresponding to this space phase, the sum of the voltages induced by the quadrature windings of one transformer member in the continuous winding of the other transformer member will be zero. Servo mechanism operates on the error signal induced in the continuous winding to drive the carriage until such error signal is zero.

One preferred form of position-measuring transformer, known as the Inductosyn,[1] utilizes the inductive field produced by a series of hairpin-like conductors, arranged in alternate north and south poles. In such a case, the primary consists of two windings spaced one-quarter cycle with respect to each other, the secondary being a single continuous winding. These transformers are of the form described in the above Tripp-Winget U.S. patent, where the conductors have been arranged and proportioned to achieve a uniformity of inductive coupling between primary and secondary windings, which is truly sinusoidal with respect to displacement. Position-measuring transformers of these types have been made wherein a cycle, that is 2 poles, occupies a space of .100 inch and the coupling is sinusoidal within one part in one thousand. By supplying precise sine and cosine potentials, respectively, to the two primary quadrature windings, an accuracy of position has been achieved of 1 milliradian (approximately one six-thousandth of a cycle or 16 millionths of an inch). The capacitive coupling between primary and secondary windings is significant by comparison with their inductive coupling, whereas the highly accurate wave form of inductive coupling does not permit of any additional couplings between primary and secondary windings or circuits of this order of magnitude.

In the above-referred to Tripp-Winget U.S. patent, the magnetic coupling is carefully corrected to be truly sinusoidal. Any additional coupling is undesirable, as is shown in Farrand-Winget U.S. application Serial No. 665,457, Reduction of Single-Turn Loop Coupling in Position-Measuring Transformer, filed June 13, 1957, now Patent 2,915,721, dated December 1, 1959, wherein fixed magnetic couplings are discussed. A constant electrostatic coupling between the fixed and movable windings will have the same defect.

In position-measuring transformers of this nature, it is customary as disclosed herein, to have an air core between the primary and secondary windings, and it is desirable to use an alternating current of a high frequency such as 10 kc. to provide sufficient coupling between the primary and secondary windings. However, the higher the frequency used the greater the capacitive coupling between the primary and secondary windings.

A further object of the present invention is to eliminate such minute extraneous capacitive couplings or reduce them to a point where they are negligible in comparison with the extremely small increment of inductive coupling required to establish accurate positioning of the magnitudes described above.

According to the invention a solid metallic sheet is placed between the fixed and movable windings. It is therefore immersed in the magnetic field produced by the two windings. It is suitably connected to substantially completely eliminate the unwanted currents due to the electrostatic coupling between the fixed and movable windings of the position-measuring transformer. The metallic sheet serves to couple the unwanted currents to ground, or to a zero potential and not to each other, thereby nullifying the effect of the plates of the unwanted capacitor. This sheet has a sufficiently high resistivity so as not to affect the magnetic coupling between the fixed and movable windings.

It has been found that in the type of position-measuring transformer described, operated at 10 kilocycles, an aluminum sheet having a thickness of approximately .0004 inch does not appreciably affect the magnetic coupling between the movable and fixed windings when connected in circuit to counter-act the unwanted capacity coupling and will completely eliminate the electrostatic coupling between them. The sheet may be mounted on either the fixed or movable windings and insulated therefrom. The insulation should be thin so as not to unnecessarily increase the equivalent air gap between the two windings. The insulation may conveniently be a sheet of plastic .0005 or .001 inch in thickness.

In one form of the invention, the metallic sheet is mounted on the single fixed winding and connected in series with it and to ground. The metallic sheet, while having a high resistance against the production of currents generated in it due to its immersion in the 10-kilocycle field, has a longitudinal resistance which is small in comparison with the resistance of the fixed winding on which it is mounted. It therefore may conveniently function also as a lead to the remote end of the fixed winding.

The invention provides an improved transformer member of the class described wherein a bond of insulating material is arranged between the conductors and the surface of a metallic member which is illustrated as an electrostatic shield.

For further details of the invention, reference may be made to the drawings wherein FIG. 1 is an enlarged, exploded perspective view, partly in section, of a position-measuring transformer wherein the capacitive coupling is reduced or eliminated according to the present invention.

FIG. 2 is an enlarged sectional view on line 2—2 of FIG. 1 looking in the direction of the arrows, with the transformer parts in normal close space relation.

FIG. 3 is a schematic circuit arrangement illustrating the circuit connections for the transformer of FIGS. 1 and 2.

Referring in detail to the drawings, the position-measuring transformer 1 comprises an air core transformer having a movable primary winding member or slider 2 having two windings 22, 23 in space quadrature, each such

[1] Registered trademark.

winding including a plurality of groups of W shaped windings, all lying in the same plane and comprising metallic deposits on a glass support 3, a representative group of each of the quadrature windings being indicated at 4 and 5 respectively in FIG. 1. Each such group has lead-in conductors as indicated at 6 and 7, each pair of such conductors extending through an aperture like 8 in the glass support 3, to the opposite side of the support, see FIGS. 9 and 15 of the Tripp-Winget patent.

The stationary secondary transformer winding member or scale is indicated at 10, being actually in close space and inductive relation with the primary member 2 as shown in FIG. 2. The secondary member 10 has a similar glass support 11 having a winding 12 thereon also in the form of a metallic deposit consisting of a single winding having leads as indicated at 13 and 14.

The continuous winding member 10 establishes the pole cycle within which position is measured by the transformer 1 and therefore it is called the scale. As previously stated, there is one conductor per pole and the pole cycle of the continuous winding member 10 may be .1". When the scale 10 is fixed in a relatively stationary position, it constitutes a reference to which the position of the quadrature winding member 2 may be referred, the latter, therefore, being movable and designated as a slider.

The active conductor portion like 15, 16, 17 and 18 of the group 4 and the similar active conductors of other groups of both of the quadrature windings 22 and 23, as well as the active conductor portions like 19 of the continuous winding 12 all extend parallel to each other and at right angles to the direction of relative movement of the transformer members 2 and 10.

By way of example, the slider or quadrature winding member 2 may be of the order of 5" in length, the scale or continuous winding 10 may be of the order of 10" in length, the scale being stationary and the slider being movable, a plurality of such scales being employed in a continuous line and connected in series in order to permit measurement of position over any desired distance.

According to the invention, a solid metallic sheet indicated at 20 in FIGS. 1 to 3 is arranged between the stationary winding 12 of scale 10 and the movable windings 22, 23 represented by the groups 4 and 5, of the slider 2. These movable and stationary windings 22, 23 and 12 respectively, constitute the primary and secondary windings respectively, of an inductively coupled transformer. The slider 2, schematically shown in FIG. 3, has windings 22 and 23 in space phase or quadrature and carries an exciting current, in the relation of sine and cosine for example, at a frequency of 10 kc. from the source indicated at 24. Source 24 is connected to a resolver or transformer 30 having quadrature windings 31, 32 which supply co-function currents in the relation of sine and cosine to the windings 22, 23 respectively.

The center tap connection 33 of the resolver or transformer 30 is brought out to one side of each slider winding 22 and 23. The other end of each resolver or transformer winding 31, 32 is then brought to the other end of the slider windings 22 and 23, so that the individual resolver and slider windings have a common junction 33. This common junction 33 is brought to ground indicated at 28 and also to one end of the shield 20 as indicated at 34. The shield 20 is in series with the scale winding 12, the adjacent ends of shield 20 and winding 12 being connected by conductor 35. The grounded terminal 34 of shield 20 and the other terminal 36 of the winding 12 are connected to the input of an amplifier 37 to supply a null indicator or other receiver eindicated at 27.

The impedance drop of the winding 22, 23 produces a voltage distribution along this winding which is applied to opposite portions of winding 12, through the capacity (air or other) of the intervening space, causing unwanted currents to be circulated in winding 12 due to this capacitive coupling. These unwanted currents add in such a way as to distort the space wave of coupling between the primary winding 22, 23 and the secondary winding 12.

The sheet 20 prevents the extraneous or unwanted capacitive or electro-static coupling from distorting the inductive coupling wave. It has been found that an electro-static shield consisting of alternate conducting bars and spaces, even with spaces as small as a few thousandths of an inch, does not produce sufficiently complete electrostatic shielding. It has been found, however, that a solid or imperforate metallic sheet when made of appropriate thinness and conductivity, can be used without substantially affecting the magnetic coupling while substantially completely eliminating the electro-static coupling.

In a preferred form, where each of the transformer windings is composed of grid-like structures, .020 inch wide and .001 inch thick, spaced .050 inch apart, one of which windings being spaced from the other by .005 to .010 inch, a solid or imperforate metallic sheet of aluminum or silver .0005 inch thick and suitably connected or grounded, completely eliminates the electrostatic coupling while not appreciably reducing the magnetic coupling and the efficiency of the transformer. Sheet silver .001 inch thick may be used with the negligible reduction in efficiency. The metallic sheet 20 is .0005" thick and the insulation 29 is also .001" thick, and another .0005" is added by the two layers of cement, not shown, one between the insulation 29 and the winding 12 and glass support 11 and another cement layer between the insulation 29 and the metallic sheet 20. The normal spacing between the slider 2 and the scale 10 is .0075" to .008" and this does not have to be increased when the metallic sheet 20 is used. The sheet 20 and the sheet of insulating material 29 have the same dimensions as the scale 10. The metal sheet 20 is outermost and no insulation is needed on its outer side, since the slider 2 is spaced so that it cannot touch the sheet 20.

Preferably, the insulating material of sheet 29 is Mylar, cellulose acetate, or the like and the cement is Pliotac or other suitable adhesive cement. Since the normal spacing between slider 2 and the scale 10 is adequate to accommodate the sheet 20, the overall thickness of which is only .0025", no increase in the spacing is necessary. It should be noted, that FIGS. 1 and 2 represent a great exaggeration of all of the dimensions of the conductive windings and the same is true of the showing of the metal sheet 20 and the sheet 29 of insulating material.

Various modifications may be made in the invention without departing from the spirit of the following claims.

I claim:

1. A position-measuring transformer having relatively movable input and output inductively related windings, each winding being distributed over an area, one of said windings overlying the other throughout a certain area, said input and output windings having a close spacing establishing a substantial magnetic coupling between them and whereby the potential distribution of the windings acts to electrostatically couple the windings together, an electrostatic shield comprising an imperforate metallic sheet of non-magnetic electrically conducting material, said sheet extending throughout the area between the windings, and a bond of insulating material between said sheet and one of said windings.

2. A position-measuring transformer according to claim 1, comprising cement between said insulation and said stationary winding and other cement between said insulation and said metallic sheet, the spacing between the winding of said movable member and the windings of said stationary member being of the order of 0.008 inch, the thickness of said metallic sheet being of the order of .00005 inch.

3. A position-measuring transformer comprising relatively movable inductively related members one of which comprises a substantially flat winding extending throughout an area and having a plurality of conductors disposed side by side and connected in series for opposite directions of current flow in adjacent conductors, a thin sheet of non-magnetic metal having a substantially flat surface extending throughout and arranged opposite said area in close spaced relation to said conductors, and a bond of insulating material between said conductors and said surface of said metal member.

4. A position-measuring transformer comprising fixed and movable position measuring transformer members each having a winding, each of said windings comprising a plurality of conductors disposed side by side and connected in series for opposite directions of current flow in adjacent conductors, the winding of said movable member comprising a plurality of windings displaced relatively to the winding of said fixed member by a fraction of the conductor spacing to form a plurality of phases in which voltages are generated in the same time phase but displaced in space phase, said fixed transformer member comprising a substantially flat metallic sheet of non-magnetic material and a relatively thin bond of insulating material between said sheet and the conductors of the winding of said fixed transformer member.

5. A position-measuring transformer comprising relatively movable transformer members one of which has a winding of transverse series-connected conductors having a surface extending throughout an area, a metallic non-magnetic member having a surface extending throughout a similar area, and a relatively thin bond of insulating material between said surfaces.

References Cited in the file of this patent
UNITED STATES PATENTS

| | | |
|---|---|---|
| 2,442,597 | Greenough | June 1, 1948 |
| 2,753,532 | Ashley et al. | July 3, 1956 |
| 2,758,283 | Starner | Aug. 7, 1956 |
| 2,799,835 | Tripp et al. | July 16, 1957 |
| 2,866,946 | Tripp | Dec. 30, 1958 |
| 2,878,441 | Rodgers | Mar. 17, 1959 |
| 2,904,762 | Schultz | Sept. 15, 1959 |
| 2,924,798 | Foster | Feb. 9, 1960 |